(12) United States Patent
Gounares et al.

(10) Patent No.: US 10,339,837 B1
(45) Date of Patent: *Jul. 2, 2019

(54) DISTRIBUTION OF SCRAMBLED BINARY OUTPUT USING A RANDOMIZED COMPILER

(71) Applicant: Polyverse Corporation, Bellevue, WA (US)

(72) Inventors: Alexander Gounares, Kirkland, WA (US); Archis Gore, Seattle, WA (US); Chris Hanaoka, Kirkland, WA (US); Ian Childress, Snoqualmie, WA (US)

(73) Assignee: POLYVERSE CORPORATION, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/996,191

(22) Filed: Jun. 1, 2018

(51) Int. Cl.
*H04L 29/06* (2006.01)
*G09C 1/00* (2006.01)
*G06F 8/52* (2018.01)
*H04L 9/00* (2006.01)

(52) U.S. Cl.
CPC ............... *G09C 1/00* (2013.01); *G06F 8/52* (2013.01); *H04L 9/002* (2013.01); *H04L 2209/08* (2013.01); *H04L 2209/12* (2013.01)

(58) Field of Classification Search
None
See application file for complete search history.

(56) References Cited

U.S. PATENT DOCUMENTS

| | | | | |
|---|---|---|---|---|
| 2003/0051233 | A1* | 3/2003 | Krishna | G06F 8/30 717/136 |
| 2010/0058303 | A1* | 3/2010 | Myles | G06F 21/14 717/159 |
| 2012/0174234 | A1* | 7/2012 | Bancel | H04L 9/002 726/26 |
| 2012/0260106 | A1* | 10/2012 | Zaks | G06F 12/1408 713/190 |
| 2013/0080805 | A1* | 3/2013 | Vick | G06F 8/4432 713/320 |

* cited by examiner

*Primary Examiner* — Malcolm Cribbs
(74) *Attorney, Agent, or Firm* — John Weatherspoon, Esq

(57) ABSTRACT

The present invention relates to methods and systems for distributing scrambled binaries, binary scrambling, and applications for cybersecurity technology aimed at preventing cyber-attacks.

1 Claim, 6 Drawing Sheets

Figure 4

System 400 binary scrambling mechanism
401 of any tie facilities 403 for securely
distributing multiple binaries
in a pre-arranged fashion

US 10,339,837 B1

DISTRIBUTION OF SCRAMBLED BINARY OUTPUT USING A RANDOMIZED COMPILER

This U.S. utility patent application is filed as a Track One patent application.

FIELD OF THE INVENTION

The present invention relates to methods and systems for binary scrambling, distribution of scrambled binary data using a randomized compiler, and applications for cybersecurity technology aimed at preventing cyber-attacks.

BACKGROUND OF THE INVENTION

As the world becomes increasingly digital, and digitally connected, cyber security continues to grow in importance. In today's world, cyber security is unfortunately asymmetric—and it favors the attacker. One fundamental aspect of the asymmetry today is the inherent "break once, run many" nature of contemporary systems.

This 'break once, run many' nature makes the economics of cyber-attacks significantly favor the attacker. The effort applied to find and develop and exploit can be leveraged across a large number of targets. Often times these attacks can be launched remotely from anywhere in the world. To make a cyber-attack worthwhile, the only remaining question is the value of the targeted data or systems.

Malware, or malicious software, is often linked to cyber-attacks. Cyber attackers often take advantage of vulnerabilities in computer programs, and are thus able to infect, damage and often disable the programs with computer viruses, malware and other malicious code.

One common set of techniques for writing malware uses approaches like return oriented programming (ROP) and jump oriented programming (JOP) to literally trick the target into behaving the way the attacker desires. In essence, the victim becomes the virus. Malware based on these techniques can be extremely hard to detect, and as a result, many "Zero Day" malware attacks are based on these techniques.

Fundamentally, malware based on these techniques requires knowledge of the target system. In simple terms, in order to 'trick' the victim into becoming the virus, the attacker needs to know very specific details about the victim, including but not limited to, the specific binary instructions used by the victim program.

Prior to this invention, the state of the art to defend against ROP/JOP style attacks was address space layout randomization (ASLR). The goal of this approach is to randomly move binaries into different memory locations, making it more difficult for attackers to know where to find the code needed to create the virus. This approach, while worthwhile, is fairly easy to work around—simply figuring out one number (e.g. a single memory address) is often sufficient to completely defeat ASLR defenses.

There is therefore a long-felt, significant and unmet need in the art for improved methods and systems for preventing and disabling the unwanted effects of malware. As long as targets remain static, attackers will be able to exploit vulnerabilities economically. It is not sufficient to just move binaries around, the binaries themselves need to be different across systems.

While creating unique and different binaries is a difficult problem unto itself, distribution of such scrambled binaries is also a very difficult problem. Many modern computing systems today such as Microsoft Windows, Linux, and Apple Macintosh OS X have a concept of patches with a centralized "system update" type server. These system update servers are typically cloud hosted on the Internet and distribute updates via small files known as "patches". Patches use a variety of technologies, but fundamentally are based on some concept of comparing the before and after binaries, and sending along just the information needed to update a before binary to the after binary.

Scrambled binaries present a challenge. Solutions to the scrambling problem such as Polyverse create literally billions of different possible binary configurations. Conventional patch mechanisms cannot cope with diversity of that magnitude.

SUMMARY OF THE INVENTION

Various aspects of the present invention provide systems and methods for distribution of scrambled binary executables.

Another aspect of the present invention provides a method and a compiler for distribution of scrambled binary executables, comprising compiling a source program via a binary scrambling compiler; generating scrambled binary output, wherein object code that is generated by the compiler for each file in the source program comprises scrambled binary data; and distributing the scrambled binary output.

Another aspect of the invention provides a method of protecting against attacks by malware and computer viruses, comprising compiling a source program via a binary scrambling compiler; generating scrambled binary output, wherein object code that is generated by the compiler for each file in the source program comprises scrambled binary data; and distributing the scrambled binary output.

Yet another aspect of the invention provides a method of protecting against attacks by malware and computer viruses, comprising compiling a source program via a binary scrambling compiler; generating scrambled binary output, wherein object code that is generated by the compiler for each file in the source program comprises scrambled binary data; and distributing the scrambled binary output, wherein the compiler comprises a component for generating the object code for each file in the source program, and a binary scrambling component for generating the scrambled binary output, and further wherein the method requires operation of at least one physical component of computer hardware architecture or microarchitecture which is absolutely and unequivocally essential and required for generating the scrambled binary output, and further wherein the method requires operation of at least one physical component of computer hardware architecture or microarchitecture which is absolutely and unequivocally essential and required for distributing the scrambled binary output.

Yet another aspect of the invention provides a method of protecting against attacks by malware and computer viruses, comprising compiling a source program via a binary scrambling compiler; generating scrambled binary output, wherein object code that is generated by the compiler for each file in the source program comprises scrambled binary data; and distributing the scrambled binary output, wherein the compiler comprises a component for generating the object code for each file in the source program, and a binary scrambling component for generating the scrambled binary output, and further wherein the method requires operation of at least one physical component of computer hardware architecture or microarchitecture which is absolutely and unequivocally essential and required for generating the scrambled binary output, and further wherein the compiler includes a technique for randomizing register allocation, and further wherein the method requires operation of at least one additional physical component of computer hardware architecture or microarchitecture which is absolutely and unequivocally essential and required to specifically perform the technique for randomizing register allocation, and further wherein the method requires operation of at least one physical component of computer hardware architecture or microarchitecture which is absolutely and unequivocally essential and required for distributing the scrambled binary output.

Yet another aspect of the invention provides a method of protecting against attacks by malware and computer viruses, comprising compiling a source program via a binary scrambling compiler; generating scrambled binary output, wherein object code that is generated by the compiler for each file in the source program comprises scrambled binary data; and distributing the scrambled binary output, wherein the compiler comprises a component for generating the object code for each file in the source program, and a binary scrambling component for generating the scrambled binary output, and further wherein the method requires operation of at least one physical component of computer hardware architecture or microarchitecture which is absolutely and unequivocally essential and required for generating the scrambled binary output, and further wherein the compiler includes a technique for randomizing function layout in the binary output, and further wherein the method requires operation of at least one additional physical component of computer hardware architecture or microarchitecture which is absolutely and unequivocally essential and required to specifically perform the technique for randomizing function layout in the binary output, and further wherein the method requires operation of at least one physical component of computer hardware architecture or microarchitecture which is absolutely and unequivocally essential and required for distributing the scrambled binary output.

Yet another aspect of the invention provides a method of protecting against attacks by malware and computer viruses, comprising compiling a source program via a binary scrambling compiler; generating scrambled binary output, wherein object code that is generated by the compiler for each file in the source program comprises scrambled binary data; and distributing the scrambled binary output, wherein the compiler comprises a component for generating the object code for each file in the source program, and a binary scrambling component for generating the scrambled binary output, and further wherein the method requires operation of at least one physical component of computer hardware architecture or microarchitecture which is absolutely and unequivocally essential and required for generating the scrambled binary output, and further wherein the compiler includes a technique for randomizing loop unrolling in the binary output, and further wherein the method requires operation of at least one additional physical component of computer hardware architecture or microarchitecture which is absolutely and unequivocally essential and required to specifically perform the technique for randomizing loop unrolling in the binary output, and further wherein the method requires operation of at least one physical component of computer hardware architecture or microarchitecture which is absolutely and unequivocally essential and required for distributing the scrambled binary output.

Yet another aspect of the invention provides a method of protecting against attacks by malware and computer viruses, comprising compiling a source program via a binary scrambling compiler; generating scrambled binary output, wherein object code that is generated by the compiler for each file in the source program comprises scrambled binary data; and distributing the scrambled binary output, wherein the compiler comprises a component for generating the object code for each file in the source program, and a binary scrambling component for generating the scrambled binary output, and further wherein the method requires operation of at least one physical component of computer hardware architecture or microarchitecture which is absolutely and unequivocally essential and required for generating the scrambled binary output, and further wherein the compiler includes a technique for randomizing import tables in the binary output, and further wherein the method requires operation of at least one additional physical component of computer hardware architecture or microarchitecture which is absolutely and unequivocally essential and required to specifically perform the technique for randomizing import tables in the binary output, and further wherein the method requires operation of at least one physical component of computer hardware architecture or microarchitecture which is absolutely and unequivocally essential and required for distributing the scrambled binary output.

Yet another aspect of the invention provides a method of protecting against attacks by malware and computer viruses, comprising compiling a source program via a binary scrambling compiler; generating scrambled binary output, wherein object code that is generated by the compiler for each file in the source program comprises scrambled binary data; and distributing the scrambled binary output, wherein the compiler comprises a component for generating the object code for each file in the source program, and a binary scrambling component for generating the scrambled binary output, and further wherein the method requires operation of at least one physical component of computer hardware architecture or microarchitecture which is absolutely and unequivocally essential and required for generating the scrambled binary output, and further wherein the compiler includes a technique for introducing chaff code in the binary output, and further wherein the method requires operation of at least one additional physical component of computer hardware architecture or microarchitecture which is absolutely and unequivocally essential and required to specifically perform the technique for introducing chaff code in the binary output, and further wherein the method requires operation of at least one physical component of computer hardware architecture or microarchitecture which is absolutely and unequivocally essential and required for distributing the scrambled binary output.

Yet another aspect of the invention provides a method of protecting against attacks by malware and computer viruses, comprising compiling a source program via a binary scrambling compiler; generating scrambled binary output, wherein object code that is generated by the compiler for each file in the source program comprises scrambled binary data; and distributing the scrambled binary output, wherein the compiler comprises a component for generating the object code for each file in the source program, and a binary scrambling component for generating the scrambled binary output, and further wherein the method requires operation of at least one physical component of computer hardware architecture or microarchitecture which is absolutely and unequivocally essential and required for generating the scrambled binary output, wherein the compiler includes a technique for substituting equivalent instructions in the binary output, and further wherein the method requires operation of at least one additional physical component of computer hardware architecture or microarchitecture which is absolutely and unequivocally essential and required to specifically perform the technique for substituting equivalent instructions in the binary output, and further wherein the method requires operation of at least one physical component of computer hardware architecture or microarchitecture which is absolutely and unequivocally essential and required for distributing the scrambled binary output.

Another aspect of the invention provides a system for distribution of scrambled binary executables, comprising a binary scrambling compiler; a patch generation mechanism; and at least one facility for securely distributing scrambled binary output through a download server, wherein the compiler comprises a component for generating the object code for each file in the source program, and a binary scrambling component for generating the scrambled binary output, and further wherein the system requires operation of at least one physical component of computer hardware architecture or microarchitecture which is absolutely and unequivocally essential and required for generating the scrambled binary output, and wherein the system further requires operation of at least one physical component of computer hardware architecture or microarchitecture which is absolutely and unequivocally essential and required for the patch generation mechanism; and wherein the system further requires operation of at least one physical component of computer hardware architecture or microarchitecture which is absolutely and unequivocally essential and required for the at least one facility for securely distributing scrambled binary output through a download server.

Yet another aspect of the invention provides a method for creating at least one on-demand system update server that serves scrambled binaries, comprising creating said scrambled binaries by compiling a source program via a scrambling compiler; and applying at least one patch process, wherein the compiler comprises a component for generating the object code for each file in the source program, and a binary scrambling component for generating the scrambled binary output, and further wherein the method requires operation of at least one physical component of computer hardware architecture or microarchitecture which is absolutely and unequivocally essential and required for generating the scrambled binary output, and wherein the method further requires operation of at least one physical component of computer hardware architecture or microarchitecture which is absolutely and unequivocally essential and required for creating the at least one on-demand system update server that serves scrambled binaries, and wherein the method further requires operation of at least one physical component of computer hardware architecture or microarchitecture which is absolutely and unequivocally essential and required for applying at least one patch process.

An additional aspect of the invention provides a physical, tangible, non-abstract system for the distribution of scrambled binaries for protecting against attacks by malware and computer viruses, wherein the system comprises at least one physical component of computer hardware architecture or microarchitecture which is absolutely and unequivocally essential and required for distributing at least one patch to source code; and at least one physical component of computer hardware architecture or microarchitecture which is absolutely and unequivocally essential and required for compiling the source code by a scrambling compiler at a destination computer, wherein the compiler comprises a component for generating the object code for each file in the source program, and a binary scrambling component for generating the scrambled binary output, and further wherein the compiler includes a technique for randomizing register allocation, and further wherein the system requires operation of at least one additional physical component of computer hardware architecture or microarchitecture which is absolutely and unequivocally essential and required to specifically perform the technique for randomizing register allocation, and further wherein the compiler includes a technique for randomizing function layout in the binary output, and further wherein the system requires operation of at least one additional physical component of computer hardware architecture or microarchitecture which is absolutely and unequivocally essential and required to specifically perform the technique for randomizing function layout in the binary output, and further wherein the compiler includes a technique for randomizing loop unrolling in the binary output, and further wherein the system requires operation of at least one additional physical component of computer hardware architecture or microarchitecture which is absolutely and unequivocally essential and required to specifically perform the technique for randomizing loop unrolling in the binary output, and further wherein the compiler includes a technique for randomizing import tables in the binary output, and further wherein the system requires operation of at least one additional physical component of computer hardware architecture or microarchitecture which is absolutely and unequivocally essential and required to specifically perform the technique for randomizing import tables in the binary output, and further wherein the compiler includes a technique for introducing chaff code in the binary output, and further wherein the system requires operation of at least one additional physical component of computer hardware architecture or microarchitecture which is absolutely and unequivocally essential and required to specifically perform the technique for introducing chaff code in the binary output, and further wherein the compiler includes a technique for substituting equivalent instructions in the binary output, and further wherein the system requires operation of at least one additional physical component of computer hardware architecture or microarchitecture which is absolutely and unequivocally essential and required to specifically perform the technique for substituting equivalent instructions in the binary output.

Another aspect of the invention provides a physical, tangible, non-abstract system for the distribution of scrambled binaries, wherein the system is operable for scrambling many variations of binaries; and wherein the system is further operable for installing at least some of the variations of scrambled binaries in a plurality of destination computing systems, further wherein the system for the distribution of scrambled binaries comprises at least one binary scrambling compiler; a patch generation mechanism; and at least one facility for securely distributing scrambled binary output through a download server, wherein the compiler comprises a component for generating the object code for each file in the source program, and a binary scrambling component for generating the scrambled binary output, and further wherein the system requires operation of at least one physical component of computer hardware architecture or microarchitecture which is absolutely and unequivocally essential and required for generating the scrambled binary output, and wherein the system further requires operation of at least one physical component of computer hardware architecture or microarchitecture which is absolutely and unequivocally essential and required for the patch generation mechanism; and wherein the system further requires operation of at least one physical component of computer hardware architecture or microarchitecture which is absolutely and unequivocally essential and required for the at least one facility for securely distributing scrambled binary output through a download server, and further wherein the system comprises at least one on-demand system update server that serves scrambled binaries, comprising at least one physical, tangible system component for creating said scrambled binaries by compiling a source program via a scrambling compiler; and applying at least one patch process, wherein the compiler comprises a component for generating the object code for each file in the source program, and a binary scrambling component for generating the scrambled binary output, and further wherein the system comprises operation of at least one physical component of computer hardware architecture or microarchitecture which is absolutely and unequivocally essential and required for generating the scrambled binary output, and wherein the system further comprises operation of at least one physical component of computer hardware architecture or microarchitecture which is absolutely and unequivocally essential and required for creating the at least one on-demand system update server that serves scrambled binaries, and wherein the system further requires operation of at least one physical component of computer hardware architecture or microarchitecture which is absolutely and unequivocally essential and required for applying at least one patch process, and further wherein the physical, tangible, non-abstract system is operable for protecting against attacks by malware and computer viruses, further wherein the system comprises at least one physical component of computer hardware architecture or microarchitecture which is absolutely and unequivocally essential and required for distributing at least one patch to source code; and at least one physical component of computer hardware architecture or microarchitecture which is absolutely and unequivocally essential and required for compiling the source code by a scrambling compiler at a destination computer, wherein the compiler comprises a component for generating the object code for each file in the source program, and a binary scrambling component for generating the scrambled binary output, and further wherein the compiler includes a technique for randomizing register allocation, and further wherein the system requires operation of at least one additional physical component of computer hardware architecture or microarchitecture which is absolutely and unequivocally essential and required to specifically perform the technique for randomizing register allocation, further wherein the compiler includes a technique for randomizing function layout in the binary output, and further wherein the system requires operation of at least one additional physical component of computer hardware architecture or microarchitecture which is absolutely and unequivocally essential and required to specifically perform the technique for randomizing function layout in the binary output, and further wherein the compiler includes a technique for randomizing loop unrolling in the binary output, and further wherein the system requires operation of at least one additional physical component of computer hardware architecture or microarchitecture which is absolutely and unequivocally essential and required to specifically perform the technique for randomizing loop unrolling in the binary output, and further wherein the compiler includes a technique for randomizing import tables in the binary output, and further wherein the system requires operation of at least one additional physical component of computer hardware architecture or microarchitecture which is absolutely and unequivocally essential and required to specifically perform the technique for randomizing import tables in the binary output, and further wherein the compiler includes a technique for introducing chaff code in the binary output, and further wherein the system requires operation of at least one additional physical component of computer hardware architecture or microarchitecture which is absolutely and unequivocally essential and required to specifically perform the technique for introducing chaff code in the binary output, and further wherein the compiler includes a technique for substituting equivalent instructions in the binary output, and further wherein the system requires operation of at least one additional physical component of computer hardware architecture or microarchitecture which is absolutely and unequivocally essential and required to specifically perform the technique for substituting equivalent instructions in the binary output, and further wherein each of the plurality of destination computing systems in turn selects a binary to use at any given time through an appropriate algorithm, and further wherein the system is operable for efficient and effective distribution of scrambled binary output, comprising compiling each file in a source program with the compiler; scrambling the binary output for each file that is compiled, and distributing the scrambled binary output.

Additional aspects of the invention will become apparent in view of the following description and associated figures.

BRIEF DESCRIPTION OF THE FIGURES

FIG. 4 is a block-diagram depiction of a system for distributing pre-scrambled binaries according to one non-limited embodiment of the present invention, wherein the system comprises a binary scrambling mechanism of any tie, and facilities for securely distributing multiple binaries in a pre-arranged fashion.

Figure 1:
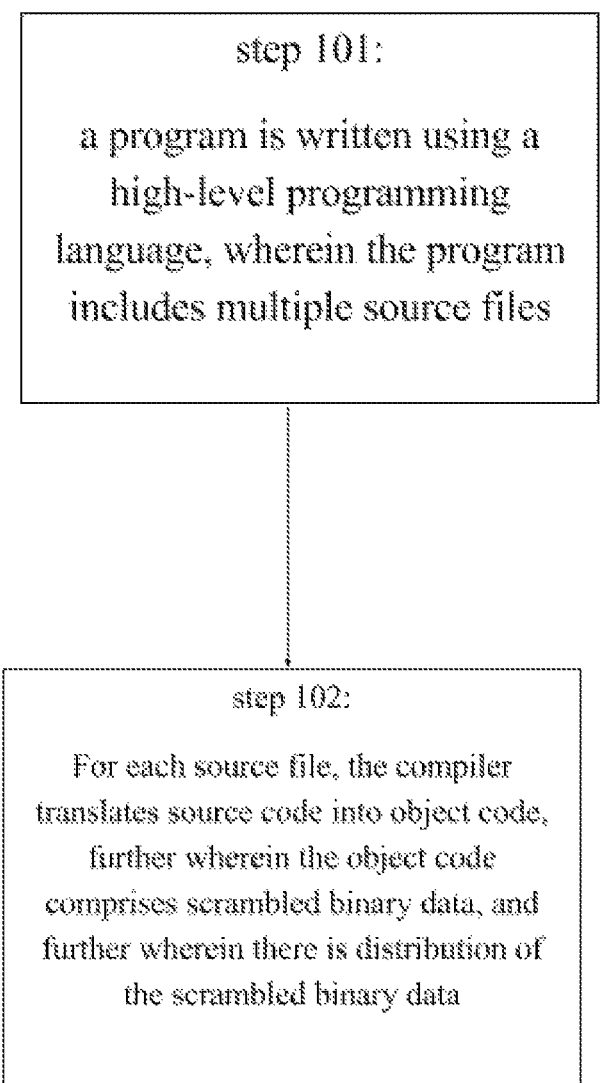
FIG. 1 illustrates a representative flowchart that depicts an overall process in accordance with the present invention, utilizing a compiler and distribution servers according to one non-limiting embodiment of the present invention.

Still other objects and advantages of preferred embodiments of the present invention will become readily apparent to those skilled in this art from the following detailed description, wherein there is described certain preferred embodiments of the invention, and examples for illustrative purposes.

DESCRIPTION OF PREFERRED EMBODIMENTS

Although the detailed description herein contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention. While embodiments are described in connection with the drawings and related descriptions, there is no intent to limit the scope to the embodiments disclosed herein. On the contrary, the intent is to cover all alternatives, modifications, and equivalents. In alternate embodiments, additional devices, or combinations of illustrated devices, may be added to, or combined, without limiting the scope to the embodiments disclosed herein.

As used herein, the phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise.

Unless defined otherwise, all technical and scientific terms used herein have the same meaning as commonly understood by one of ordinary skill in the art.

As used herein, in accordance with the present invention, the term "compiler" is understood to refer to any program that translates each separate source file into an "object" file, and thereby translates source code into object code, which can then be combined to form machine executable files (commonly known as applications or application binaries). In this invention, the object code and resulting application binaries are scrambled from the original, unmodified form that would occur without this invention.

As used herein, a compiler used in accordance with the present invention operates as a "randomized compiler" such that the object code that is generated by the compiler for each file comprises scrambled binary data or "randomized" binary data.

As used herein, the term "source file" is understood to refer to any file that contains program instructions or source code, and which can be written using any high-level programming language. A "source program" is intended to refer to any computer program or software program and can include multiple source files. By way of non-limiting example, examples of high-level programming languages include, but are not limited to, C, C++, Pascal, Perl, Cobol, Java, and Python.

In accordance with the present invention, any high-level programming language can be used to write the source program or software, and the high-level programming language has no relation with any specific computer hardware. The present invention can be implemented using any type of compiler and any type of computer hardware system, network system, or other platform. As used herein, the term "computer hardware system" is intended to include all the necessary components of a computer system that are required to "run" or execute a source program, and that allow someone to use the computer. By way of non-limiting example, the hardware components include, but are not limited to, a power supply, motherboard, hard disk, graphics card, Random access memory (RAM), and other hardware components. Additional hardware components can include, for instance, a keyboard, mouse, speakers, etc.

It should be appreciated that the present invention can be implemented in numerous ways, including as a process, an apparatus, a system, a device, a method, or a computer readable medium. Several inventive embodiments of the present invention are described below.

The present invention can be implemented using any type of compiler and any type of computer hardware system, network system, or other platform. Several representative compilers are described herein. As used herein, the term "computer hardware system" is intended to include all the necessary components of a computer system that are required to "run" or execute a source program, and that allow someone to use the computer. By way of non-limiting example, the hardware components include, but are not limited to, a power supply, motherboard, hard disk, graphics card, Random access memory (RAM), and other hardware components. Additional hardware components can include, for instance, a keyboard, mouse, speakers, etc.

According to one preferred embodiment, it is therefore contemplated that the methods and systems of the present invention can be implemented by operation of any type of computer system that includes computer components including but not limited to a processor, memory storage devices for the processor, connected display devices and input devices. Furthermore, the methods and systems of the present invention can also be implemented by operation of computer components in a heterogeneous distributed computing environment, including for example one or more remote file servers, computer servers, and/or memory storage devices. Each of these distributed computing components is accessible by the processor via a communication network, which may include, but is not limited to, the Internet.

As used herein, the term "scramble" is intended to include any procedure, method or process that produces randomized binary output for each file. Such methods include, but are not limited to, scrambling via a source code compiler and scrambling via pure binary scrambler.

"Scrambled binary output" or "scrambled binary output data" thus includes, but is not limited to, any form of binary data that is reorganized or reconfigured in a random manner such that the original functionality is either still preserved or could be restored.

As used herein, the term "binary scrambling" is intended to include any method, procedure, or process that can be utilized, performed or implemented to scramble binary output data at the level of a compiler.

As used herein, the phrases "distributing scrambled binary output" and "distribution of scrambled binary output" refer to any method or procedure of distributing scrambled binary output, preferably in a manner that comprises compiling each file in a source program with a compiler, scrambling the binary output for each file that is compiled, and distributing the scrambled binary output.

One embodiment of the present invention provides a method and a compiler for distribution of scrambled binary executables, comprising compiling a source program via a binary scrambling compiler; generating scrambled binary output, wherein object code that is generated by the compiler for each file in the source program comprises scrambled binary data; and distributing the scrambled binary output.

Another embodiment of the invention provides a method of protecting against attacks by malware and computer viruses, comprising compiling a source program via a binary scrambling compiler; generating scrambled binary output, wherein object code that is generated by the compiler for each file in the source program comprises scrambled binary data; and distributing the scrambled binary output.

Yet another embodiment of the invention provides a method of protecting against attacks by malware and computer viruses, comprising compiling a source program via a binary scrambling compiler; generating scrambled binary output, wherein object code that is generated by the compiler for each file in the source program comprises scrambled binary data; and distributing the scrambled binary output, wherein the compiler comprises a component for generating the object code for each file in the source program, and a binary scrambling component for generating the scrambled binary output, and further wherein the method requires operation of at least one physical component of computer hardware architecture or microarchitecture which is absolutely and unequivocally essential and required for generating the scrambled binary output, and further wherein the method requires operation of at least one physical component of computer hardware architecture or microarchitecture which is absolutely and unequivocally essential and required for distributing the scrambled binary output.

Yet another embodiment of the invention provides a method of protecting against attacks by malware and computer viruses, comprising compiling a source program via a binary scrambling compiler; generating scrambled binary output, wherein object code that is generated by the compiler for each file in the source program comprises scrambled binary data; and distributing the scrambled binary output, wherein the compiler comprises a component for generating the object code for each file in the source program, and a binary scrambling component for generating the scrambled binary output, and further wherein the method requires operation of at least one physical component of computer hardware architecture or microarchitecture which is absolutely and unequivocally essential and required for generating the scrambled binary output, and further wherein the compiler includes a technique for randomizing register allocation, and further wherein the method requires operation of at least one additional physical component of computer hardware architecture or microarchitecture which is absolutely and unequivocally essential and required to specifically perform the technique for randomizing register allocation, and further wherein the method requires operation of at least one physical component of computer hardware architecture or microarchitecture which is absolutely and unequivocally essential and required for distributing the scrambled binary output.

Yet another embodiment of the invention provides a method of protecting against attacks by malware and computer viruses, comprising compiling a source program via a binary scrambling compiler; generating scrambled binary output, wherein object code that is generated by the compiler for each file in the source program comprises scrambled binary data; and distributing the scrambled binary output, wherein the compiler comprises a component for generating the object code for each file in the source program, and a binary scrambling component for generating the scrambled binary output, and further wherein the method requires operation of at least one physical component of computer hardware architecture or microarchitecture which is absolutely and unequivocally essential and required for generating the scrambled binary output, and further wherein the compiler includes a technique for randomizing function layout in the binary output, and further wherein the method requires operation of at least one additional physical component of computer hardware architecture or microarchitecture which is absolutely and unequivocally essential and required to specifically perform the technique for randomizing function layout in the binary output, and further wherein the method requires operation of at least one physical component of computer hardware architecture or microarchitecture which is absolutely and unequivocally essential and required for distributing the scrambled binary output.

Yet another embodiment of the invention provides a method of protecting against attacks by malware and computer viruses, comprising compiling a source program via a binary scrambling compiler; generating scrambled binary output, wherein object code that is generated by the compiler for each file in the source program comprises scrambled binary data; and distributing the scrambled binary output, wherein the compiler comprises a component for generating the object code for each file in the source program, and a binary scrambling component for generating the scrambled binary output, and further wherein the method requires operation of at least one physical component of computer hardware architecture or microarchitecture which is absolutely and unequivocally essential and required for generating the scrambled binary output, and further wherein the compiler includes a technique for randomizing loop unrolling in the binary output, and further wherein the method requires operation of at least one additional physical component of computer hardware architecture or microarchitecture which is absolutely and unequivocally essential and required to specifically perform the technique for randomizing loop unrolling in the binary output, and further wherein the method requires operation of at least one physical component of computer hardware architecture or microarchitecture which is absolutely and unequivocally essential and required for distributing the scrambled binary output.

Yet another embodiment of the invention provides a method of protecting against attacks by malware and computer viruses, comprising compiling a source program via a binary scrambling compiler; generating scrambled binary output, wherein object code that is generated by the compiler for each file in the source program comprises scrambled binary data; and distributing the scrambled binary output, wherein the compiler comprises a component for generating the object code for each file in the source program, and a binary scrambling component for generating the scrambled binary output, and further wherein the method requires operation of at least one physical component of computer hardware architecture or microarchitecture which is absolutely and unequivocally essential and required for generating the scrambled binary output, and further wherein the compiler includes a technique for randomizing import tables in the binary output, and further wherein the method requires operation of at least one additional physical component of computer hardware architecture or microarchitecture which is absolutely and unequivocally essential and required to specifically perform the technique for randomizing import tables in the binary output, and further wherein the method requires operation of at least one physical component of computer hardware architecture or microarchitecture which is absolutely and unequivocally essential and required for distributing the scrambled binary output.

Yet another embodiment of the invention provides a method of protecting against attacks by malware and computer viruses, comprising compiling a source program via a binary scrambling compiler; generating scrambled binary output, wherein object code that is generated by the compiler for each file in the source program comprises scrambled binary data; and distributing the scrambled binary output, wherein the compiler comprises a component for generating the object code for each file in the source program, and a binary scrambling component for generating the scrambled binary output, and further wherein the method requires operation of at least one physical component of computer hardware architecture or microarchitecture which is absolutely and unequivocally essential and required for generating the scrambled binary output, and further wherein the compiler includes a technique for introducing chaff code in the binary output, and further wherein the method requires operation of at least one additional physical component of computer hardware architecture or microarchitecture which is absolutely and unequivocally essential and required to specifically perform the technique for introducing chaff code in the binary output, and further wherein the method requires operation of at least one physical component of computer hardware architecture or microarchitecture which is absolutely and unequivocally essential and required for distributing the scrambled binary output.

Yet another embodiment of the invention provides a method of protecting against attacks by malware and computer viruses, comprising compiling a source program via a binary scrambling compiler; generating scrambled binary output, wherein object code that is generated by the compiler for each file in the source program comprises scrambled binary data; and distributing the scrambled binary output, wherein the compiler comprises a component for generating the object code for each file in the source program, and a binary scrambling component for generating the scrambled binary output, and further wherein the method requires operation of at least one physical component of computer hardware architecture or microarchitecture which is absolutely and unequivocally essential and required for generating the scrambled binary output, wherein the compiler includes a technique for substituting equivalent instructions in the binary output, and further wherein the method requires operation of at least one additional physical component of computer hardware architecture or microarchitecture which is absolutely and unequivocally essential and required to specifically perform the technique for substituting equivalent instructions in the binary output, and further wherein the method requires operation of at least one physical component of computer hardware architecture or microarchitecture which is absolutely and unequivocally essential and required for distributing the scrambled binary output.

Another embodiment of the invention provides a system for distribution of scrambled binary executables, comprising a binary scrambling compiler; a patch generation mechanism; and at least one facility for securely distributing scrambled binary output through a download server, wherein the compiler comprises a component for generating the object code for each file in the source program, and a binary scrambling component for generating the scrambled binary output, and further wherein the system requires operation of at least one physical component of computer hardware architecture or microarchitecture which is absolutely and unequivocally essential and required for generating the scrambled binary output, and wherein the system further requires operation of at least one physical component of computer hardware architecture or microarchitecture which is absolutely and unequivocally essential and required for the patch generation mechanism; and wherein the system further requires operation of at least one physical component of computer hardware architecture or microarchitecture which is absolutely and unequivocally essential and required for the at least one facility for securely distributing scrambled binary output through a download server.

Yet another embodiment of the invention provides a method for creating at least one on-demand system update server that serves scrambled binaries, comprising creating said scrambled binaries by compiling a source program via a scrambling compiler; and applying at least one patch process, wherein the compiler comprises a component for generating the object code for each file in the source program, and a binary scrambling component for generating the scrambled binary output, and further wherein the method requires operation of at least one physical component of computer hardware architecture or microarchitecture which is absolutely and unequivocally essential and required for generating the scrambled binary output, and wherein the method further requires operation of at least one physical component of computer hardware architecture or microarchitecture which is absolutely and unequivocally essential and required for creating the at least one on-demand system update server that serves scrambled binaries, and wherein the method further requires operation of at least one physical component of computer hardware architecture or microarchitecture which is absolutely and unequivocally essential and required for applying at least one patch process.

An additional embodiment of the invention provides a physical, tangible, non-abstract system for the distribution of scrambled binaries for protecting against attacks by malware and computer viruses, wherein the system comprises at least one physical component of computer hardware architecture or microarchitecture which is absolutely and unequivocally essential and required for distributing at least one patch to source code; and at least one physical component of computer hardware architecture or microarchitecture which is absolutely and unequivocally essential and required for compiling the source code by a scrambling compiler at a destination computer, wherein the compiler comprises a component for generating the object code for each file in the source program, and a binary scrambling component for generating the scrambled binary output, and further wherein the compiler includes a technique for randomizing register allocation, and further wherein the system requires operation of at least one additional physical component of computer hardware architecture or microarchitecture which is absolutely and unequivocally essential and required to specifically perform the technique for randomizing register allocation, and further wherein the compiler includes a technique for randomizing function layout in the binary output, and further wherein the system requires operation of at least one additional physical component of computer hardware architecture or microarchitecture which is absolutely and unequivocally essential and required to specifically perform the technique for randomizing function layout in the binary output, and further wherein the compiler includes a technique for randomizing loop unrolling in the binary output, and further wherein the system requires operation of at least one additional physical component of computer hardware architecture or microarchitecture which is absolutely and unequivocally essential and required to specifically perform the technique for randomizing loop unrolling in the binary output, and further wherein the compiler includes a technique for randomizing import tables in the binary output, and further wherein the system requires operation of at least one additional physical component of computer hardware architecture or microarchitecture which is absolutely and unequivocally essential and required to specifically perform the technique for randomizing import tables in the binary output, and further wherein the compiler includes a technique for introducing chaff code in the binary output, and further wherein the system requires operation of at least one additional physical component of computer hardware architecture or microarchitecture which is absolutely and unequivocally essential and required to specifically perform the technique for introducing chaff code in the binary output, and further wherein the compiler includes a technique for substituting equivalent instructions in the binary output, and further wherein the system requires operation of at least one additional physical component of computer hardware architecture or microarchitecture which is absolutely and unequivocally essential and required to specifically perform the technique for substituting equivalent instructions in the binary output.

Another embodiment of the invention provides a physical, tangible, non-abstract system for the distribution of scrambled binaries, wherein the system is operable for scrambling many variations of binaries; and wherein the system is further operable for installing at least some of the variations of scrambled binaries in a plurality of destination computing systems, further wherein the system for the distribution of scrambled binaries comprises at least one binary scrambling compiler; a patch generation mechanism; and at least one facility for securely distributing scrambled binary output through a download server, wherein the compiler comprises a component for generating the object code for each file in the source program, and a binary scrambling component for generating the scrambled binary output, and further wherein the system requires operation of at least one physical component of computer hardware architecture or microarchitecture which is absolutely and unequivocally essential and required for generating the scrambled binary output, and wherein the system further requires operation of at least one physical component of computer hardware architecture or microarchitecture which is absolutely and unequivocally essential and required for the patch generation mechanism; and wherein the system further requires operation of at least one physical component of computer hardware architecture or microarchitecture which is absolutely and unequivocally essential and required for the at least one facility for securely distributing scrambled binary output through a download server, and further wherein the system comprises at least one on-demand system update server that serves scrambled binaries, comprising at least one physical, tangible system component for creating said scrambled binaries by compiling a source program via a scrambling compiler; and applying at least one patch process, wherein the compiler comprises a component for generating the object code for each file in the source program, and a binary scrambling component for generating the scrambled binary output, and further wherein the system comprises operation of at least one physical component of computer hardware architecture or microarchitecture which is absolutely and unequivocally essential and required for generating the scrambled binary output, and wherein the system further comprises operation of at least one physical component of computer hardware architecture or microarchitecture which is absolutely and unequivocally essential and required for creating the at least one on-demand system update server that serves scrambled binaries, and wherein the system further requires operation of at least one physical component of computer hardware architecture or microarchitecture which is absolutely and unequivocally essential and required for applying at least one patch process, and further wherein the physical, tangible, non-abstract system is operable for protecting against attacks by malware and computer viruses, further wherein the system comprises at least one physical component of computer hardware architecture or microarchitecture which is absolutely and unequivocally essential and required for distributing at least one patch to source code; and at least one physical component of computer hardware architecture or microarchitecture which is absolutely and unequivocally essential and required for compiling the source code by a scrambling compiler at a destination computer, wherein the compiler comprises a component for generating the object code for each file in the source program, and a binary scrambling component for generating the scrambled binary output, and further wherein the compiler includes a technique for randomizing register allocation, and further wherein the system requires operation of at least one additional physical component of computer hardware architecture or microarchitecture which is absolutely and unequivocally essential and required to specifically perform the technique for randomizing register allocation, further wherein the compiler includes a technique for randomizing function layout in the binary output, and further wherein the system requires operation of at least one additional physical component of computer hardware architecture or microarchitecture which is absolutely and unequivocally essential and required to specifically perform the technique for randomizing function layout in the binary output, and further wherein the compiler includes a technique for randomizing loop unrolling in the binary output, and further wherein the system requires operation of at least one additional physical component of computer hardware architecture or microarchitecture which is absolutely and unequivocally essential and required to specifically perform the technique for randomizing loop unrolling in the binary output, and further wherein the compiler includes a technique for randomizing import tables in the binary output, and further wherein the system requires operation of at least one additional physical component of computer hardware architecture or microarchitecture which is absolutely and unequivocally essential and required to specifically perform the technique for randomizing import tables in the binary output, and further wherein the compiler includes a technique for introducing chaff code in the binary output, and further wherein the system requires operation of at least one additional physical component of computer hardware architecture or microarchitecture which is absolutely and unequivocally essential and required to specifically perform the technique for introducing chaff code in the binary output, and further wherein the compiler includes a technique for substituting equivalent instructions in the binary output, and further wherein the system requires operation of at least one additional physical component of computer hardware architecture or microarchitecture which is absolutely and unequivocally essential and required to specifically perform the technique for substituting equivalent instructions in the binary output, and further wherein each of the plurality of destination computing systems in turn selects a binary to use at any given time through an appropriate algorithm, and further wherein the system is operable for efficient and effective distribution of scrambled binary output, comprising compiling each file in a source program with the compiler; scrambling the binary output for each file that is compiled, and distributing the scrambled binary output.

By way of non-limiting example, a combination of scrambling algorithms are used to perform binary scrambling, and thus to scramble the binary data for each separate file that is compiled.

By way of non-limiting example, according to the present invention, when a source file is compiled, the compiler will compile the source file in such a manner that the object code has a randomized binary form, i.e., the object code that is generated by the compiler for each file comprises scrambled binary data.

The present invention can be utilized with any type of compiler that translates source code into object code.

Referring to FIG. 1, at step 101, a program is written using a high-level programming language, wherein the program includes multiple source files. At step 102, for each source file, the compiler translates source code into object code, further wherein the object code that is generated by the compiler for each file comprises scrambled binary data, and further wherein there is distribution of the scrambled binary data.

Figure 2:
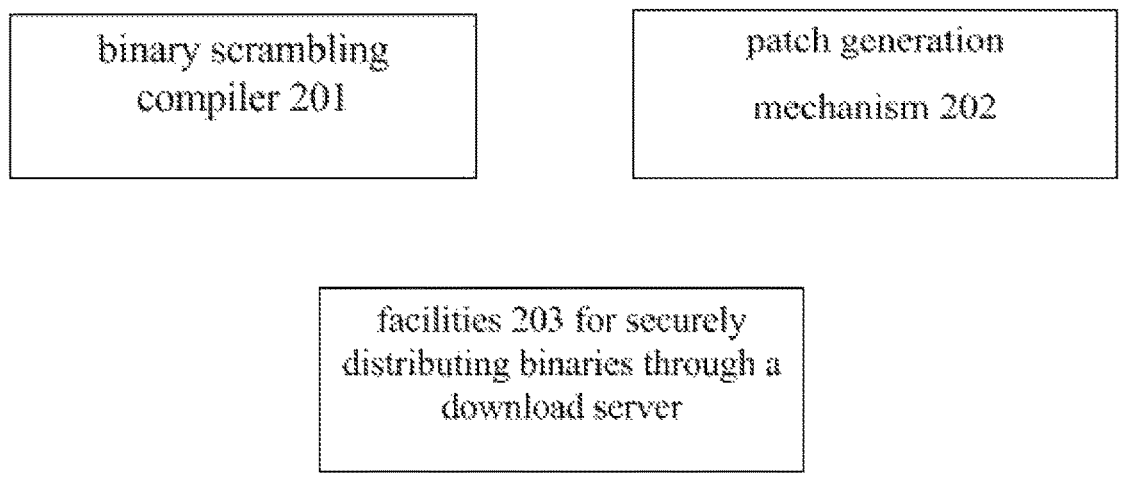
FIG. 2 is a block-diagram depiction of a scrambling distribution system according to one non-limiting embodiment of the present invention, wherein the system comprises a binary scrambling compiler, a patch generation mechanism, and facilities for securely distributing binaries through a download server, further wherein it is understood from the description herein that the compiler includes components for analyzing semantics and syntax, for generating object code for each file in the source program, and a binary scrambling component, further wherein the object code that is generated by the compiler for each file comprises scrambled binary data.

FIG. 2 is a block-diagram depiction of a representative scrambling distribution system 200 according to one non-limiting embodiment of the present invention, wherein the system 200 comprises a binary scrambling compiler 201, a patch generation mechanism 202, and facilities 203 for securely distributing binaries through a download server. It is understood from the description herein that the compiler 201 includes a component for analyzing semantics within a source program; a component for analyzing syntax within a source program; a component for generating object code for each file in the source program, and a binary scrambling component, wherein the object code that is generated by the compiler 201 for each file comprises scrambled binary data.

In accordance with a preferred embodiment of the present invention, a compiler comprises a front end and a backend in which the backend is more dependent on the architectural framework of the system. Preferably, the front end comprises a Lexical Analyzer, Syntax Analyzer and Semantic Analyzer. The Lexical Analyzer isolates each part of a statement and tokenizes each part as operands, operator, variable, constants etc. The lexical analysis phase reads the characters in the program and groups them into tokens that are sequence of characters having a collective meaning. The Syntax Analyzer parses the token sequence and identifies the syntactic structure of the program. The Semantic Analyzer checks for type errors and adds all the necessary semantic information to the parse tree.

The backend of the compiler preferably comprises an Intermediate Code Generator, Code Optimizer and Code Generator for generating object code for each file in the source program. The representative compiler further includes a binary scrambling component, wherein the object code that is generated by the compiler for each file comprises scrambled binary data.

With regard to the Intermediate Code Generator, this phase of the compiler transforms parser tree into an intermediate language representation of the source program. Intermediate codes are machine independent codes, but they are close to machine instructions. With regard to the Code Optimizer, code optimization is utilized in order to modify the working code to a more optimal code. In accordance with the present invention, the code optimization phase improves the intermediate code, so that faster running machine code will result. The Code Generator takes the optimized intermediate representation of the source program as input and then produces a target program or object program as its output. The final phase of the compiler is the generation of the target code or machine code or assembly code. Memory locations are selected for each of the variables used by the program. Intermediate instructions are then translated into a sequence of machine instructions that perform the same task. The back end performs the intermediate code generation, code optimization and generation which are very significant parts in the compilation process, wherein the object code that is generated by the compiler for each file comprises scrambled binary data.

By way of non-limiting example, the present invention can be used with any type of compiler, for instance a C++ compiler. When a C++ compiler reads a source file (an input file) and translates the source file into a binary data file containing its results (the object file), the C++ source code is thus compiled into binary code. In accordance with the present invention, the object code is in scrambled binary data format.

By way of non-limiting example, when compiling C++ source code from each of a number of different C++ programming language source files, one could type the command:
   gcc file.cpp
where 'file' is replaced by the name of each of the different C++ files. In accordance with the present invention, each C++ class file that is produced by the C++ compiler of the present invention has machine instructions in scrambled binary output format. The output file can be executed on a computer as it normally would.

The scrambled transformations are of arbitrary complexity, and will vary by specific programming language and instruction set of the target computer. According to a preferred embodiment of the invention, the scrambled transformations include, but are not limited to, one or more of the following transformations:

1. Register reallocation, and specifically substituting equivalent hardware registers where possible. For example, on x86 based CPU chips, register eax may be used interchangeably with register ebx.
2. Reordering of functions. Traditionally, functions are laid out in a binary file in source code order. In this invention, the layout order is randomized.
3. Loop unrolling randomness. Loop unrolling is a well known technique to avoid branching and optimize certain instruction set sequences. For example, instead of a loop to count five items, the five items can be counted sequentially. In this invention, the limit for loop unrolling should be changed, and similarly, partial unrolling can be performed.
4. Introduction of no-ops and other obfuscation code. Dummy code, or chaff, should be inserted in various locations around the binary to create additional entropy. When chaff code is inserted into reachable areas (i.e. the code could be executed), care should be taken to ensure that it is a no-op—e.g. adding 100 and then subtracting 100 afterwards. Arbitrary code may be inserted in unreachable areas of a binary.
5. Substitution of alternative instructions to perform semantically equivalent operations. For example, multiplication of X by 2 can be substituted with an addition of X+X.
6. Changing the order of evaluation of expressions where it is legal to do so (e.g. commutative operations)
7. Modification and randomization of import tables and other lookup tables. Traditionally these tables are either in source code order or alphabetical; the layout should instead be randomized.

The net result of performing all of these modifications is to introduce a significant level of entropy into the resulting binaries, while preserving the semantic functionality and performance of the binary. The probability of a 10 gadget ROP chain virus successfully working on a twenty megabyte binary scrambled in such a fashion is approximately 8×10-15, 8 in a quadrillion. Smaller or larger binaries will have smaller and larger entropy of course. The cybersecurity benefit however is the same, cyberattackers will have to engineer different malware to attack the scrambled binary.

Historical attempts at binary diversity have failed to produce such entropy. The ASLR (address space layout randomization) technique used by Microsoft Windows, Linux, and other operating systems for example has one degree of entropy. Simply knowing a single number-a single address—is enough to defeat that technique. Similarly, techniques with 16 bits of entropy or less can be defeated easily through brute force techniques of simply guessing every possible combination.

Figure 3:
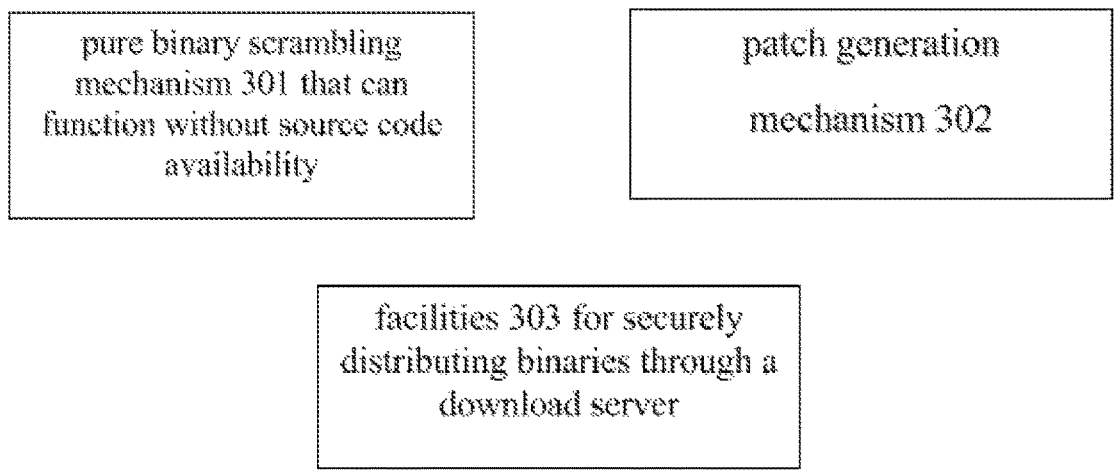
FIG. 3 is a block-diagram depiction of a scrambling distribution system according to one non-limiting embodiment of the present invention, wherein the system comprises a pure binary scrambling mechanism that can function without source code availability, a patch generation mechanism, and facilities for securely distributing binaries through a download server.

FIG. 3 is a block-diagram depiction of a representative scrambling distribution system 300 according to one non-limiting embodiment of the present invention, wherein the system comprises a pure binary scrambling mechanism 301 that can function without source code availability, a patch generation mechanism 302, and facilities 303 for securely distributing binaries through a download server.

FIG. 4 is a block-diagram depiction of a system 400 for distributing pre-scrambled binaries according to one non-limited embodiment of the present invention, wherein the system 400 comprises a binary scrambling mechanism 401 of any tie, and facilities 403 for securely distributing multiple binaries in a pre-arranged fashion.

Figure 5:
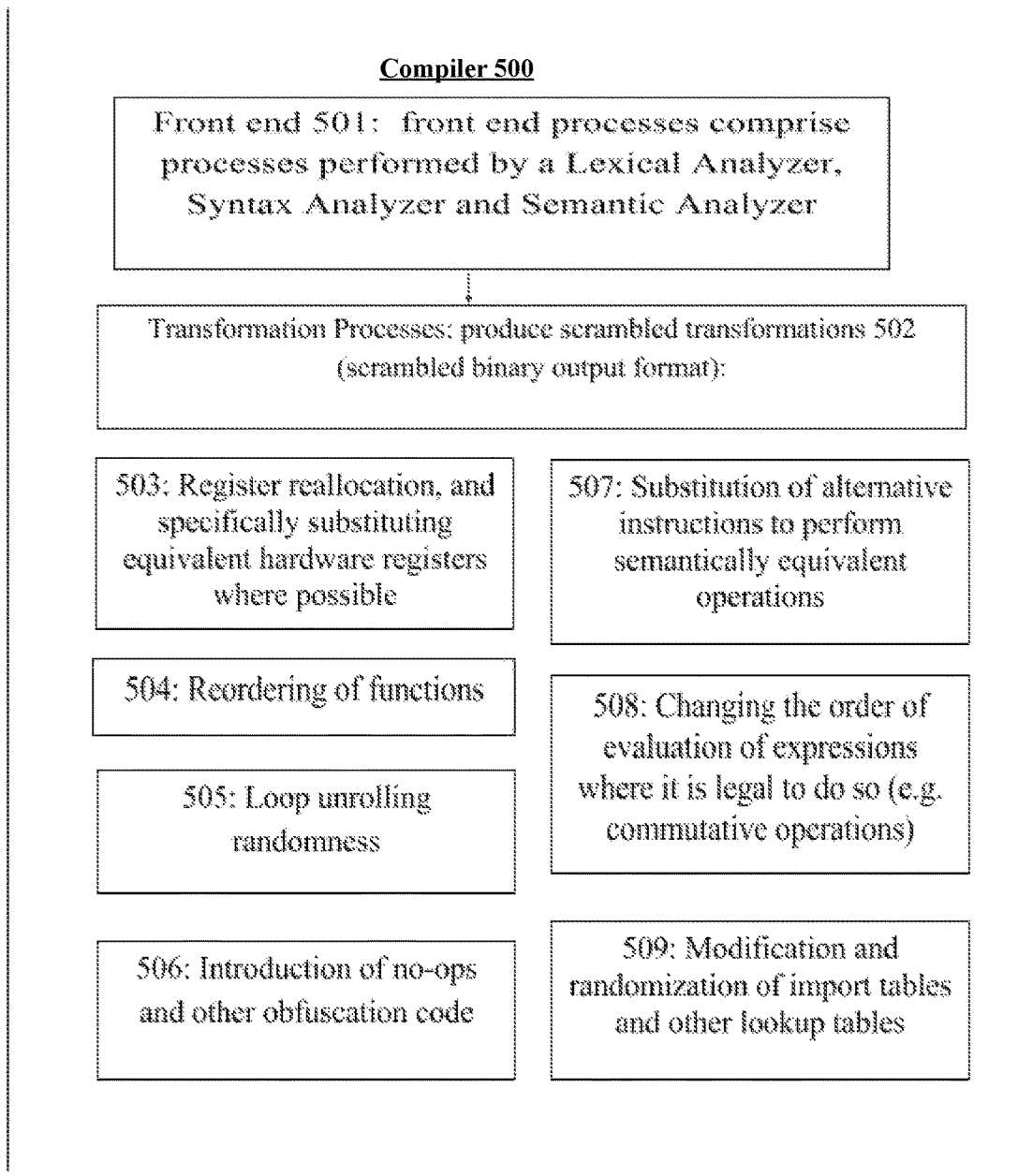
FIG. 5 depicts a representative example of a compiler that can be used in accordance with the present invention.

FIG. 5 depicts a representative example of a compiler that can be used in accordance with the present invention. A compiler 500 is shown that depicts a front end 501, wherein examples of front end processes include, but are not limited to, processes performed by a Lexical Analyzer, Syntax Analyzer and Semantic Analyzer. The backend of the compiler 500 comprises, for example, an Intermediate Code Generator, Code Optimizer and Code Generator for generating object code for each file in the source program, wherein the object code that is generated by the compiler 500 for each file comprises scrambled binary data. Referring again to FIG. 5, the scrambled transformations 502 include, but are not limited to, one or more transformations such as the following (1) Register reallocation, and specifically substituting equivalent hardware registers where possible (503); (2) Reordering of functions (504); (3) Loop unrolling randomness (505); (4) Introduction of no-ops and other obfuscation code (506); (5) Substitution of alternative instructions to perform semantically equivalent operations (507); (6) Changing the order of evaluation of expressions where it is legal to do so (e.g. commutative operations) (508); and (7) modification and randomization of import tables and other lookup tables (509).

In accordance with the present invention, any type of scrambled code can be introduced, and any type of software program can be scrambled or obfuscated, including, for example, binary program images; byte-code images such as Java™ class files; intermediate code forms produced by compilers; executable files; assembly language programs; source code representations; and various other program representations.

In other embodiments of the invention, one or more other types of scrambled transformations or obfuscation transformations can be performed in accordance with the present invention, such that object code that is generated by the compiler for each file in the source program comprises scrambled binary output. One or more scrambled transformations or obfuscation transformations can be applied, for example, to the computer program's local structure, control graph, and/or data structure in order to render the program more difficult to understand and/or modify. According to one example of a scrambled transformation, a binary code modification tool is linked with a program module containing code for performing a variety of scrambled transformations.

In other embodiments, scrambled transformations that can be used to generate scrambled binary data can include, for example, one or more transformations (a) that add complexity to the binary data, (b) those that remove structure from the binary data, (c) those that remove useful information, and (d) those that add disinformation. For instance, a scrambled transformation that adds complexity or removes structure will typically make both static and dynamic analysis of the program more difficult, and thus be useful for protecting against attacks by malware and computer viruses. Similarly, the removal of useful information, such as symbol tables, leaves the attacker with less to work from; while the addition of disinformation, such as misleading symbol tables, can cause an attacker to make incorrect assumptions.

Scrambled transformations are applied automatically, wherein a physical, tangible, non-abstract computer hardware system as described further herein is essential and required for carrying out physical, non-abstract computerized operations for the automatic application of scrambled transformations, in accordance with the principles of the present invention. The automatic application of scrambled transformations is utilized, wherein a physical, tangible, non-abstract computer hardware system as described further herein is essential and required for carrying out physical, non-abstract computerized operations for the automatic application of scrambled transformations, because in most instances such transformations should be applied pervasively and repeatedly to increase their effectiveness.

Preferred methods of the present invention, for protecting against attacks by malware and computer viruses, comprise compiling a source program with a compiler, such that object code that is generated by the compiler for each file in the source program comprises scrambled binary output. The methods of the present invention also allow one to achieve the desired speed of the compiled code (e.g., fast compilation) and interoperability among languages.

According to other certain embodiments of the invention, a process of compiling a source program with a compiler may also include one or more code optimization processes, such that the object code that is generated by the compiler for each file comprises scrambled binary data. Such code optimization processes may include processes of modifying the working code to a more optimal code based on the goal of generating scrambled binary data. In preferred embodiments, code optimization processes can be performed to improve the intermediate code, to achieve the goal of generating scrambled binary data. Such code optimization processes can include, for example, high-level optimizations (e.g., code optimization processes which are performed on the source with output fed to later optimization passes); local optimizations for optimizing code; global optimizations; and processor-dependent optimizations which take advantage of specific knowledge of the computer architecture or micro-architecture.

As described herein, the present invention can be implemented using any type of compiler and any type of computer hardware system, network system, or other platform. The compiler is used such that the high level executions that are made in a programming language are compiled and implemented by the underlying hardware computer architecture.

According to the present invention, any type of effective compiler can be used which allows for efficient execution of application programs for a given computer architecture, and preferred architectural features can be utilized to support more effective compiler optimization techniques.

Figure 6:
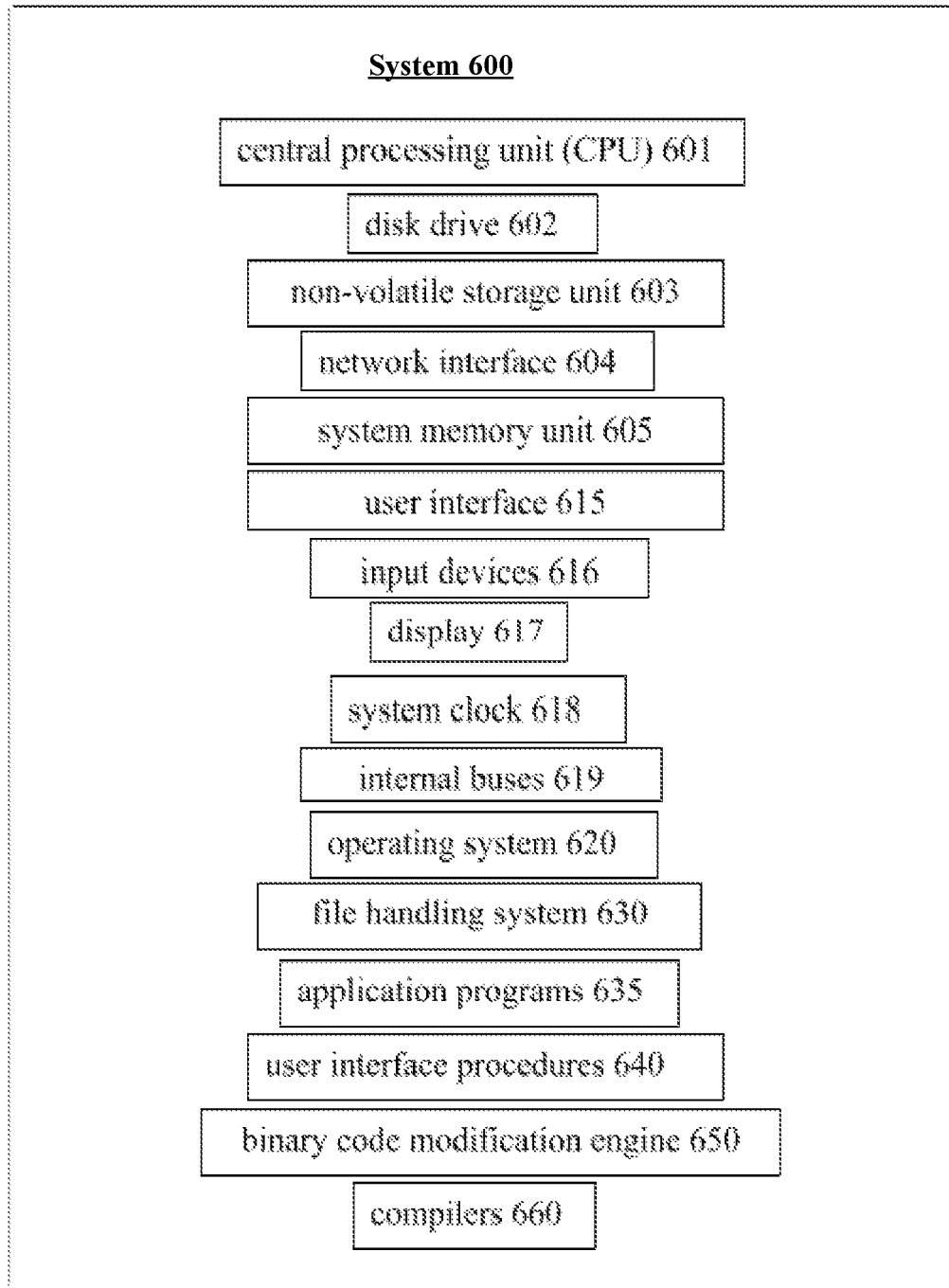
FIG. 6 depicts a representative system that can be used in accordance with the present invention.

As described herein, the present invention can be implemented using any type of compiler and any type of computer hardware system, network system, or other platform. A representative system, such as a workstation or personal computer, can be used for practicing the present invention. As shown in FIG. 6, a representative system 600 that can be used in accordance with the invention includes one or more of the following: a central processing unit (CPU) 601; an optical and/or magnetic disk drive 602 for reading from and/or writing to CDs, diskettes, or other storage media; a non-volatile storage unit 603, such as a hard disk drive, for storing data and program files; a network interface 604 for connecting computer system 600 to a network such as the Internet; a system memory unit 605, preferably including both high-speed read only memory (ROM) and random access memory (RAM), for storing, e.g., data, system control programs, and application programs loaded from disk drive 602, storage unit 603, and/or network interface 604, such programs including programs incorporating computer code that embodies or implements aspects of the present invention; a user interface 615, including one or more input devices 616 and a display 617; a system clock 618; and one or more internal buses 619 for interconnecting the elements of the system 600. The operation of the system 600 is preferably controlled primarily by programs stored in system memory (e.g., RAM) and executed by CPU 601. These programs could include an operating system 620; a file handling system 630; one or more application programs 635; a set of user interface procedures 640; a binary code modification engine 650 for modifying and/or rearranging binary code and for applying scrambling transformations and obfuscation transformations; and one or more compilers 660 as described herein, wherein one or more compilers 660 comprise a component for generating object code for each file in the source program, and a binary scrambling component for generating the scrambled binary output. It should be appreciated that while FIG. 6 sets forth an exemplary system for practicing embodiments of the present invention, other systems with different architectures and different configurations of subsystems could also be used. For example, embodiments of the present invention can be practiced using only a limited subset of the components shown in FIG. 6. Accordingly, it should be understood that the system shown in FIG. 6 is intended to be illustrative and not limiting.

To achieve desired compiler optimization, the specific computer architecture or microarchitecture can be selected as desired. For example, the number of registers can be increased to make it easier for the compiler to allocate registers.

One preferred embodiment of the present invention provides a method and a compiler for creating at least one on-demand system update server that serves scrambled binaries, and preferably a plurality of on-demand system update servers that serve scrambled binaries. Such binaries can be created by compiling a source program via a scrambling compiler or other mechanism as needed. As the before binary is of unknown and random configuration, the patch process in turn simply generates patches of the form 'replace the entire before version with this new version'.

Another aspect of the invention provides a method of distribution of scrambled binaries by distributing patches to source code as opposed to binary code. This source code in turn is compiled by a scrambling compiler at the destination computer.

An additional aspect of the invention allows for presumptively scrambling many variations of binaries and installing a large number of the variations in the destination computing systems. The destination system in turn selects a binary to use at any given time through an appropriate algorithm (e.g. random selection, round robin, etc.).

Yet another aspect of the invention provides a method of distributing scrambled binary output, comprising compiling each file in a source program with a compiler, scrambling the binary output for each file that is compiled, and distributing the scrambled binary output of such intermediate files.

The scrambled transformations are of arbitrary complexity, and will vary by specific programming language and instruction set of the target computer. These transformations can include, but are not limited to, register reallocation, reordering of functions, modifying loop unrolling, introduction of no-ops and other obfuscation code, substitution of alternative instructions to perform semantically equivalent operations, changing the order of evaluation of expressions where it is legal to do so (e.g. commutative operations), and so forth. The net result of the scrambling is a binary output that performs the same end functionality, but with different steps along the way.

By changing the binary in this fashion, cyberattackers will have to engineer different malware to attack the scrambled binary.

In one non-limiting example, the scrambled binary is generated and stored on a central server. Destination computing systems (that is, where the scrambled binaries should live) simply access that server through standard protocols (e.g. a Linux package manager like rpm or apt). RPM, apt-get). The central server can be located close to the destination computers or in the cloud.

When distributing through standard package managers like rpm, apt, and apk, care must be taken to provide appropriate signatures and cryptographic hashes. These signatures are used by standard package manager systems to ensure that downloaded binaries match what is on the server. In the case of distributing scrambled binaries, each binary will have a unique signature and hash. Therefore, the package manifests for the package manager systems need to be continuously updated, or updated uniquely for each scrambled binary. This can be accomplished in a number of means, including per caller and on a tome interval.

When distributing through standard package managers, an on-demand build system also needs to be incorporate to refresh downloaded binaries with newly scrambled binaries. Without such a mechanism, a subsequent download would result in downloading the same binary, reducing the efficacy of the scrambled binary approach. The on-demand build system can be implemented in a variety of means, in a non-limited example, via a load balancing predictive job dispatcher that anticipates download demand and presumptively builds freshly scrambled binaries in time for future downloads.

In another non-limiting example, the build system of an application is modified to produce N distinct scrambled binaries (where N is an arbitrary number greater than 1). These binaries are collected and included with the application's native distribution mechanism, such as a Chef or Puppet script for servers, a Windows installer package, a Linux package, a Docker container, or similar. The application in turn is modified to select at runtime one of the N images to use at any given time. The selection algorithm can be arbitrary, such as randomly selecting, a round robin algorithm, and so forth.

In yet another non-limiting example, a compiler based binary scrambling technology is installed in each destination computing system, and source code is kept in a centralized server. Updates to the source are distributed through a patch or other update mechanism (e.g. source code control update).

Regardless of mechanism, the net effect is that each destination computing system is able to obtain uniquely scrambled binaries. In a non-limited mobile application example, each time that the same mobile application source program (e.g. "mobile app X") is downloaded for use by a different user, e.g. for use on a smart phone, tablet, laptop, computer, or other electronic device, the same mobile app X will actually be specific or unique to each separate user of the mobile app X. Therefore, by way of non-limiting example, user A of mobile app X will have a "mobile app X identity" that is absolutely unique to user A because user A's downloaded copy of mobile app X will have its own, specific and unique scrambled binary output after mobile app X has been compiled by the randomized compiler specifically for user A. In a similar manner, user B of mobile app X will have a completely separate and distinct "mobile app X identity" that is absolutely unique to user B because user B's downloaded copy of mobile app X will have its own, specific and unique scrambled binary output after mobile app X has been compiled by the randomized compiler specifically for user B. It is important to emphasize that, from the user's standpoint, user A's mobile app X will function in an identical manner (i.e. have the same functionality) as user B's mobile app X. However, one of the very significant advantages, in accordance with the present invention, is that a cyber-attacker cannot disable or damage every single downloaded copy of mobile app X, because every downloaded copy of mobile app X will have its own, specific and unique scrambled binary output after mobile app X has been compiled by the randomized compiler specifically for each separate user.

In one non-limiting example, a C++ program is written for visually rendering an image on a screen, for instance, an image of a tree. In this example, each of the C++ source files has source code that is used for visually rendering a different part of the tree (including branches, leaves, etc). Continuing with this non-limiting example, as described herein, each object file that is produced by the C++ compiler of the present invention has machine instructions scrambled in a manner according to the present invention. Thus, each resulting image (i.e., each separate image of a tree that is visualized on the screen) will have a unique compilation of binary object files, since each C++ source file that is used to render the overall image has object code that has been intentionally scrambled or randomized.

When the compiler of the present invention translates source code into object code, the compiler can also analyze for correct syntax and also for any semantic errors. When compiling a source program, error handling can also be performed, wherein one or more errors of the source program can be detected when compiling the source program. If an error is discovered, for example an error in the spelling of a word, processing can be performed to correct the error, and the compiler can continue until the source code for every source file in the source program is translated into object code.

Prevention and Disabling of Unwanted Effects of Malware and Other Malicious Code By way of non-limiting example, the methods and systems of the present invention are very effective in reducing, disabling and/or eliminating the unwanted effects of viruses, malware and other malicious code.

With conventional compilers, the object files comprising object code are linked together to form an executable file. In many instances, when these conventional compilers are utilized, a computer virus or malware will spread or "infect" another host computer when the executable code is shared with an infected source.

Unlike conventional approaches that utilize only conventional compilers, the present invention provides a method and a compiler for compiling a source program, such that the object code that is generated by the compiler for each file comprises scrambled binary output. The present invention thus provides security for a computer system and protection against attacks by malware and computer viruses, since the object code that is generated by the compiler for each file comprises scrambled binary output. Because the object code for each file comprises scrambled binary output, the target program is not vulnerable to attack, and the malware will not spread or "infect" another host computer. The present invention also provides security against "Zero Day Malware" which, under conventional circumstances, typically would not allow any significant amount of time to defend against an attack.

A Representative Preferred Embodiment of the Invention

According to one representative preferred embodiment, the present invention comprises the following:

A physical, tangible, non-abstract system for the distribution of scrambled binaries, wherein the system is operable for scrambling many variations of binaries; and wherein the system is further operable for installing at least some of the variations of scrambled binaries in a plurality of destination computing systems, further wherein the system for the distribution of scrambled binaries comprises at least one binary scrambling compiler; a patch generation mechanism; and at least one facility for securely distributing scrambled binary output through a download server, wherein the compiler comprises a component for generating the object code for each file in the source program, and a binary scrambling component for generating the scrambled binary output, and further wherein the system requires operation of at least one physical component of computer hardware architecture or microarchitecture which is absolutely and unequivocally essential and required for generating the scrambled binary output, and wherein the system further requires operation of at least one physical component of computer hardware architecture or microarchitecture which is absolutely and unequivocally essential and required for the patch generation mechanism; and wherein the system further requires operation of at least one physical component of computer hardware architecture or microarchitecture which is absolutely and unequivocally essential and required for the at least one facility for securely distributing scrambled binary output through a download server, and further wherein the system comprises at least one on-demand system update server that serves scrambled binaries, comprising at least one physical, tangible system component for creating said scrambled binaries by compiling a source program via a scrambling compiler; and applying at least one patch process, wherein the compiler comprises a component for generating the object code for each file in the source program, and a binary scrambling component for generating the scrambled binary output, and further wherein the system comprises operation of at least one physical component of computer hardware architecture or microarchitecture which is absolutely and unequivocally essential and required for generating the scrambled binary output, and wherein the system further comprises operation of at least one physical component of computer hardware architecture or microarchitecture which is absolutely and unequivocally essential and required for creating the at least one on-demand system update server that serves scrambled binaries, and wherein the system further requires operation of at least one physical component of computer hardware architecture or microarchitecture which is absolutely and unequivocally essential and required for applying at least one patch process, and further wherein the physical, tangible, non-abstract system is operable for protecting against attacks by malware and computer viruses, further wherein the system comprises at least one physical component of computer hardware architecture or microarchitecture which is absolutely and unequivocally essential and required for distributing at least one patch to source code; and at least one physical component of computer hardware architecture or microarchitecture which is absolutely and unequivocally essential and required for compiling the source code by a scrambling compiler at a destination computer, wherein the compiler comprises a component for generating the object code for each file in the source program, and a binary scrambling component for generating the scrambled binary output, and further wherein the compiler includes a technique for randomizing register allocation, and further wherein the system requires operation of at least one additional physical component of computer hardware architecture or microarchitecture which is absolutely and unequivocally essential and required to specifically perform the technique for randomizing register allocation, further wherein the compiler includes a technique for randomizing function layout in the binary output, and further wherein the system requires operation of at least one additional physical component of computer hardware architecture or microarchitecture which is absolutely and unequivocally essential and required to specifically perform the technique for randomizing function layout in the binary output, and further wherein the compiler includes a technique for randomizing loop unrolling in the binary output, and further wherein the system requires operation of at least one additional physical component of computer hardware architecture or microarchitecture which is absolutely and unequivocally essential and required to specifically perform the technique for randomizing loop unrolling in the binary output, and further wherein the compiler includes a technique for randomizing import tables in the binary output, and further wherein the system requires operation of at least one additional physical component of computer hardware architecture or microarchitecture which is absolutely and unequivocally essential and required to specifically perform the technique for randomizing import tables in the binary output, and further wherein the compiler includes a technique for introducing chaff code in the binary output, and further wherein the system requires operation of at least one additional physical component of computer hardware architecture or microarchitecture which is absolutely and unequivocally essential and required to specifically perform the technique for introducing chaff code in the binary output, and further wherein the compiler includes a technique for substituting equivalent instructions in the binary output, and further wherein the system requires operation of at least one additional physical component of computer hardware architecture or microarchitecture which is absolutely and unequivocally essential and required to specifically perform the technique for substituting equivalent instructions in the binary output, and further wherein each of the plurality of destination computing systems in turn selects a binary to use at any given time through an appropriate algorithm, and further wherein the system is operable for efficient and effective distribution of scrambled binary output, comprising compiling each file in a source program with the compiler; scrambling the binary output for each file that is compiled, and distributing the scrambled binary output.

further wherein the compiler includes a component for analyzing semantics within a source program; a component for analyzing syntax within a source program; a component for generating object code for each file in the source program, and a binary scrambling component, wherein the object code that is generated by the compiler for each file comprises scrambled binary data.

further wherein the system is operable to introduce a significant level of entropy into the resulting binaries, while preserving the semantic functionality and performance of the binary, further wherein the probability of a 10 gadget ROP chain virus successfully working on a twenty megabyte binary scrambled in such a fashion is approximately $8 \times 10^{-15}$, 8 in a quadrillion.

The foregoing descriptions of the embodiments of the present invention have been presented for purposes of illustration and description. They are not intended to be exhaustive or to limit the present invention to the precise forms disclosed. Although specific embodiments have been illustrated and described herein, a variety of alternate and/or equivalent implementations may be substituted for the specific embodiments shown and described without departing from the scope of the present disclosure. This application is intended to cover any adaptations or variations of the embodiments discussed herein.

The invention claimed is:

1. A physical, tangible, non-abstract computer system, said system comprising:
   a system memory unit storing instructions to modify and rearrange binary code to produce scrambled binaries, wherein operation of the computer system is controlled by said instructions stored in the system memory unit and executed by a processor, the processor comprising a central processing unit, and the instructions comprising an operating system, a file handling system, and a set of user interface procedures;
   the processor executing said instructions to modify and rearrange said binary code to produce said scrambled binaries;
   a binary code modification engine modifying and rearranging said binary code and applying scrambling transformations and obfuscation transformations;
   said processor further executing instructions to randomize register allocation, randomize function layout in the binary output, randomize loop unrolling in the binary output, randomize import tables in the binary output, introduce chaff code in the binary output, and substitute equivalent instructions in the binary output;

said processor further executing instructions to implement a patch generation mechanism, a mechanism to implement on-demand generation of the scrambled binaries, and at least one facility to distribute the scrambled binaries through a download server;

the system memory unit further comprising random access memory, said random access memory storing said distributed scrambled binaries;

one or more memory storage devices storing and retrieving said distributed scrambled binaries, said one or more memory storage devices comprising an optical disk drive, a magnetic disk drive, and a hard disk drive, said one or more memory storage devices accessible by the processor via a communication network;

said processor further executing instructions to install at least some of the scrambled binaries in a plurality of destination computing systems, wherein each of the plurality of destination computing systems in turn selects a binary to use at any given time through an appropriate algorithm;

said system further comprising distributed computer components in a heterogeneous distributed computing environment, said distributed computer components comprising one or more remote file servers, computer servers, and one or more memory storage devices;

said one or more remote file servers accessible by the processor via a communication network;

said one or more computer servers accessible by the processor via a communication network;

wherein the computer system protects against attacks by malware and computer viruses, further wherein the system introduces entropy into the binaries, while preserving semantic functionality and performance of the binaries, further wherein the probability of a 10 gadget return oriented programming (ROP) chain virus successfully working on a twenty megabyte binary scrambled by the system is approximately $8 \times 10^{-15}$;

said system further comprising a connected display device, an input device, and a network interface connecting the computer system to a network, and said system further comprising a power supply, a motherboard, a graphics card, a user interface, a system clock, and one or more internal buses interconnecting the elements of the system.

* * * * *